United States Patent
Kuykendal

[19]

[11] Patent Number: 5,773,791
[45] Date of Patent: Jun. 30, 1998

[54] WATER LASER MACHINE TOOL

[76] Inventor: Robert Kuykendal, Water Works Inc. 1136 Washington Suite 600, St. Louis, Mo. 63101

[21] Appl. No.: 706,787

[22] Filed: Sep. 3, 1996

[51] Int. Cl.$^6$ ................................................. B23K 26/14
[52] U.S. Cl. ..................................................... 219/121.84
[58] Field of Search ......................... 219/121.84; 239/18

[56] References Cited

U.S. PATENT DOCUMENTS

| | | | |
|---|---|---|---|
| 3,503,804 | 3/1970 | Schneider | 219/121.84 |
| 3,821,510 | 6/1974 | Muncheryan | 219/121.84 |
| 4,403,134 | 9/1983 | Klingel | 219/121.84 |
| 4,952,771 | 8/1990 | Wrobel | 219/121.84 |
| 5,160,086 | 11/1992 | Kuykendal et al. | 239/18 |
| 5,609,781 | 3/1997 | Kaga et al. | 219/121.84 |

FOREIGN PATENT DOCUMENTS

| | | | |
|---|---|---|---|
| 60-3913 | 1/1985 | Japan | 219/121.84 |
| 1-249289 | 10/1989 | Japan | 219/121.84 |

*Primary Examiner*—Geoffrey S. Evans
*Attorney, Agent, or Firm*—Henry W. Cummings

[57] ABSTRACT

A high energy laser is imbedded into a highly laminar high pressure stream by pumping fluid (preferably water) into a conduit, controlling the flow of fluid by a valve in the conduit, introducing the fluid into an outlet orifice assembly with a fluid chamber and a diffuser within the fluid chamber to dampen major currents of fluid velocity. A laser beam is aligned and directed through the outlet orifice. The fluid exiting the orifice creates a laminar fluid stream about the laser. The outlet orifice can have a knife edged orifice.

10 Claims, 2 Drawing Sheets

WATER LASER MACHINE TOOL

I. FIELD OF THE INVENTION

This invention relates to machine tools and specifically to a machine cutting tool involving a high energy laser imbedded into a highly laminar high pressure stream.

II. BACKGROUND OF THE INVENTION

The use of high energy laser as cutting tools in certain machine operations is established technology. For example, U.S. Pat. No. 4,403,134 (1983) discloses the use of a laser beam for cutting a work piece and the simultaneous application of water cooling fluid applied to the work piece at the same time that the laser beam is applied. However the laser beam is not supplied to the work piece within a laminar fluid stream, as in the present invention.

The use of high pressure water as a machine tool is also well established.

Furthermore techniques been developed to create very highly laminar streams which conduct laser light in a manner similar to a fiber optic cable. For example, U.S. Pat. No. 5,160,086 granted Nov. 6, 1992 discloses a method and apparatus for forming a very laminar flow fluid stream for use both in decorative water fountains and in industrial applications. However, it does not teach the use of such a laminar flow fluid in conjunction with a laser for machining, or cutting a work piece.

III. OBJECTS OF THE INVENTION

One object of the present invention is to improve the level of safety attainable in connection with the use of lasers for machining, cutting and shaping.

Another object of the present invention is to increase the effectiveness of lasers for machining, shaping and cutting.

Another object of the present invention is to increase the effectiveness and accuracy of high pressure fluid streams for machining, shaping and cutting.

Another object of the present invention is to enable machining, shaping and cutting of materials not previously treatable with laser or high pressure fluid.

Another object of the present invention is to obtain better accuracy and finish than previously obtained through the use of lasers or high pressure fluids for machining, cutting or shaping of materials.

Another object of the present invention is to provide a system having very low laser heat losses in a fluid stream prior to the time the fluid stream and the laser simultaneously strike the object to be treated.

Another object of the present invention is to utilize essentially all of the laser energy available to effect cutting.

Another object of the present invention is to utilize the micro explosive action of high pressure steam and high energy laser simultaneously.

IV SUMMARY OF THE INVENTION

The present invention comprises a method and apparatus for forming a high energy laser imbedded into a laminar high pressure fluid stream whereby the combined effect of the laser cutting and water cutting are applied simultaneously to the work piece to be treated.

V THE DRAWINGS

VI DESCRIPTION OF PREFERRED EMBODIMENTS

Figure 1:
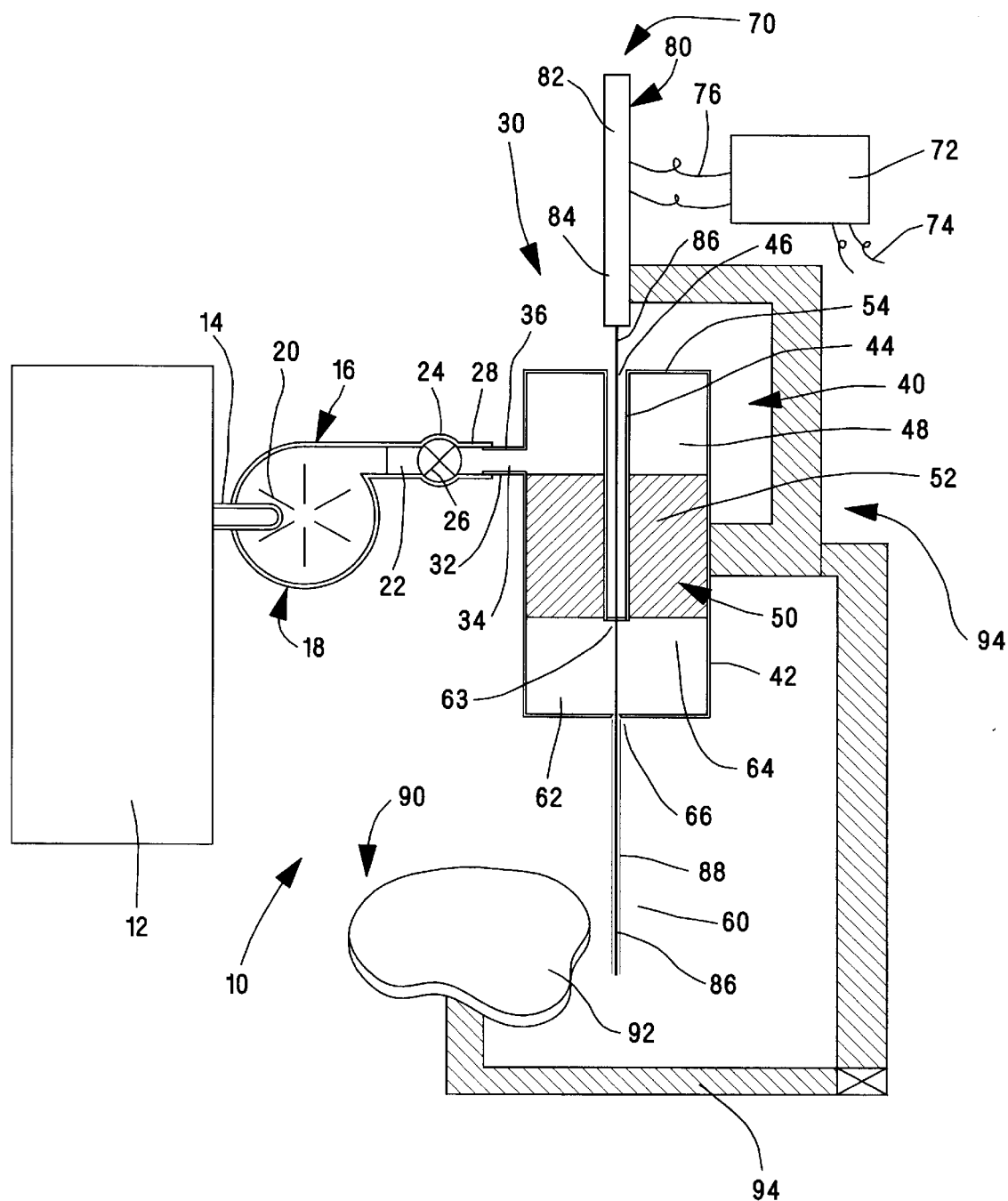
FIG. 1 is a schematic illustration of the method and apparatus of high energy laser located within a high pressure fluid stream for machining, cutting, and cutting in accordance with the present invention.
Figure 2:
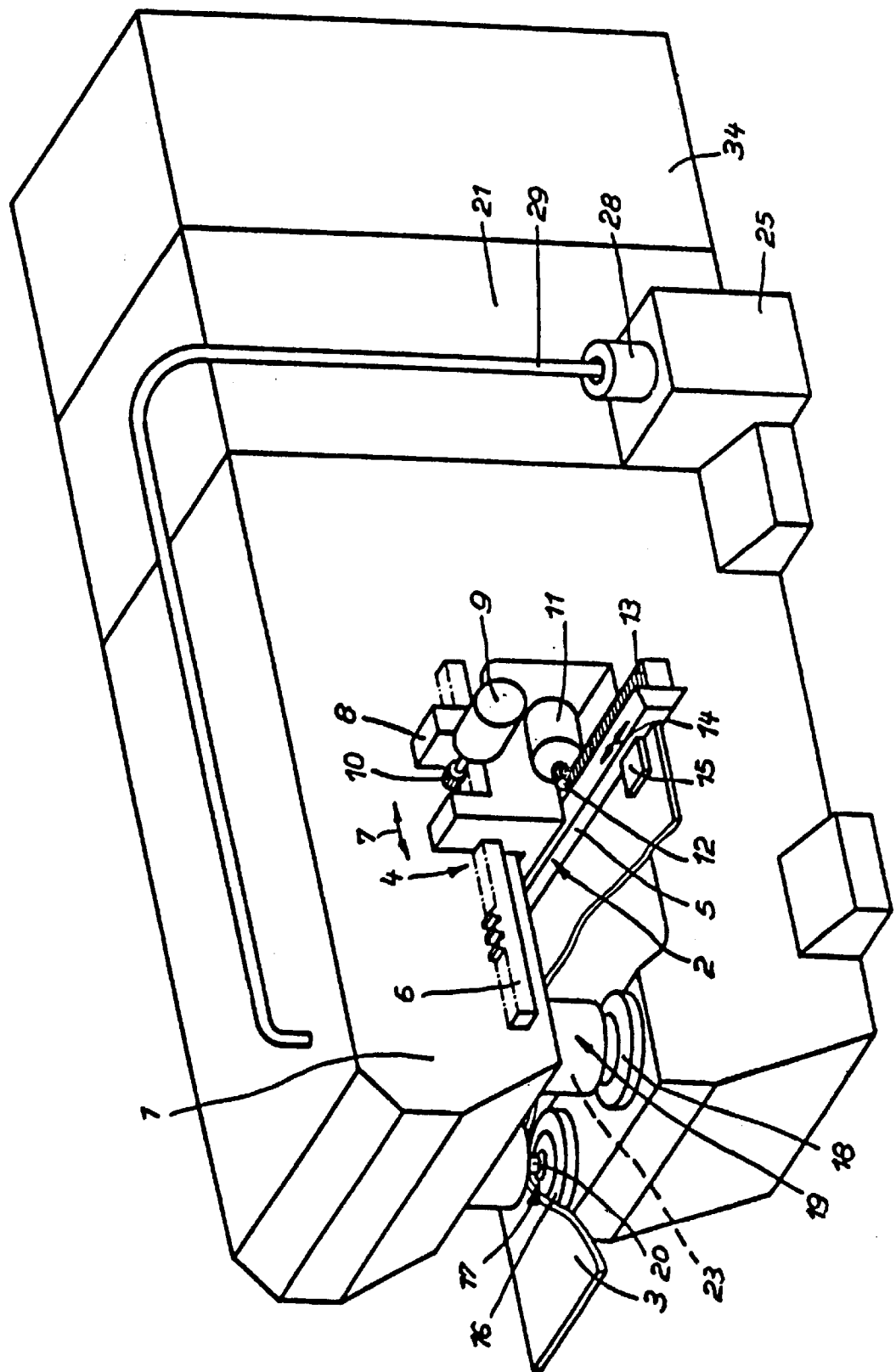
FIG. 2 is a schematic perspective view of a support and positioning apparatus which may be used in the present invention.

The method and apparatus for forming the imbedment laser within a laminar flow fluid stream is indicated in FIG. 1 at (10).

This apparatus includes a source of fluid pressure preferably water pressure (12). This may be the ordinary water supply which is obtained from a municipality and supplied to an industrial business or factory.

A conduit (14) transports, the fluid preferably liquid water to a pumping means indicated generally at (16). This pumping means may include a centrifugal pump (18) having veins (20) to force the fluid stream in a direction indicated from left to right in FIG. 1. Alternatively a reciprocating pump may be used.

Another conduit (22) conveys the fluid to a pressure regulating and fluid control means (24). As an example this pressure regulating and fluid control means, may comprise a valve (26) which may be either manually or automatically controlled and which is movable between a closed position and a wide variety of partially open, and a full open position. Such pressure regulating valves are available. Granger Cat.#382#1Z885B.

Another conduit (28) transfers the fluid from the pressure control means (24) into a laminar flow generating nozzle means indicated generally at (30). This nozzle means may be as described in detail in U.S. Pat. No. 5,160,086 hereby incorporated into the present application by this reference, which includes an inlet port (32). This inlet port for example may comprise a double walled latter hose.

An optional baffle (34) may be provided to break up forward current in the inlet port (36) as described in the '086 patent.

Inlet port (36) is in fluid communication with a housing indicated generally at (40).

Housing (40) includes a generally cylindrical outer wall (42) and a cylindrical inner wall (44) having an opening (46). Cylindrical walls (42) and (44) define a fluid chamber (48) which receives the fluid from inlet port (36).

A diffuser means indicated generally at (50) is located within the chamber (48) and is spaced from end wall (54) and (64).

The diffuser means maybe any of the materials described in U.S. Pat. No. 5,160,086 to provide a large plurality of parallel fluid paths to dampen fluid currents by lowering the fluid velocity and hence the Reynolds number.

After the fluid enters chamber (48) it passes downwardly through diffuser material (52) into an outlet orifice assembly (60) including a chamber (62) defined by outer wall (42) and a bottom wall (64) containing a knife shaped orifice (66). The orifice for example may be constructed as described in greater detail in said U.S. Pat. No. 5,160,086.

A laser light generating means indicated generally at (70) includes a laser power supply (72) receiving electrical power through wires (74) from a source of electricity available from an electrical company or municipality (not shown). The power supply (72) supplies electrical power through wires (76) to a laser generating device indicated generally at (80). Laser generating devise (80) is of known construction and for example may be of the type illustrated in U.S. Pat. No. 4,403,134.

The laser forming means is contained within a conduit (82) and includes a laser beam focusing device (84). The laser beam (86) exits the conduit (82) and extends into the opening (46) within the inner wall (44) of the nozzle assembly (40). The laser beam (86) continues downwardly through opening (46) into a transparent window (63) and into chamber (62) and orifice (66). Simultaneously at orifice (66) fluid material is exiting from the chamber (62) in essentially laminar flow, whereby a combination of laminar flow fluid (88) and the laser beam (86) is contained within the laminar fluid flow (88).

A work piece assembly (90) including a work piece (92) to be machined indicated is supported in a conventional manner by a support assembly (94) such as illustrated in U.S. Pat. No. 4,403,134. Therefore, the support system may comprise a C shaped frame 1 with longitudinal and transverse positioners 4, 5., incorporated herein by this reference, especially col. 4, line 46 to col. 5, line 18.

The combination of the laminar flow fluid and the laser beam are effective to machine the work piece (92) to a very accurate shape in a minimal amount of time.

Moreover losses of laser energy are greatly minimized by the fluid stream surrounding the laser beam.

It will be apparent that the level of safety attainable in connection with the method and apparatus described herein is greatly improved by the channeling and shielding effect of the fluid stream as it carries the laser beam to the object machine.

Further more laser energy reflected off the work piece is effectively shielded by the turbulent fluid steam emulating from the point of contact on the work piece.

Accuracy of the machining of the work piece is improved in accordance with the technique of the present invention by imbedding the laser into the fluid stream.

Moreover materials not previously machineable with either lasers or high pressure fluid material is now possible.

Thus greater accuracy and greater finish characteristics are obtained through the use of the imbedded laser technique, than has previously been obtained.

What is claimed is:

1. Apparatus for cutting, shaping, or machining comprising:

first conduit means for receiving fluid material from a source or reservoir of fluid materials;

means for pumping said fluid material into a second conduit means containing means for regulating and controlling the pressure of said fluid material;

third conduit means for transferring said fluid material from said pressure regulating control means to an outlet orifice assembly;

said outlet orifice assembly comprising an inlet valve and a first outer wall and a laterally spaced inner wall inwardly from said first outer wall;

a fluid chamber defined between said inner wall and said first outer wall;

diffuser means located within said fluid chamber to dampen major currents of fluid velocity;

a longitudinally extending opening defined by said inner wall;

means for generating electrical power sufficient for generating a laser beam located adjacent said first outer wall;

said laser beam generating means located adjacent said electrical power supply and adjacent said first outer wall;

alignment means for directing said laser beam into said opening within said inner wall;

means for passing said laser beam through said inner wall and into said lower chamber;

means for directing said laser beam through said orifice means whereby said laser beam is imbedded by a laminar fluid stream of said fluid as it exits from said outlet orifice; and means for directing said laser beam and said laminar fluid stream to a work piece for machining, cutting, or shaping.

2. Apparatus according to claim 1 wherein said inlet valve comprises a double walled bladder fluid supply hose.

3. Apparatus according to claim 1 wherein said outer wall is cylindrical and wherein said inner wall is cylindrical.

4. Apparatus according to claim 1 wherein said orifice means comprises a knife edge orifice.

5. Apparatus according to claim 1 wherein means are provided for moving said work piece to engage said laser imbedded fluid stream.

6. A method of machining, shaping or cutting comprising;

providing a source of fluid;

pumping said fluid from said source into a conduit;

controlling the flow of said fluid with a valve means located within said conduit;

introducing said fluid into a nozzle assembly comprising an outer wall and an inner wall;

passing said fluid through a diffuser means to dampen major currents by lowering the velocity of said fluid;

passing said fluid into an orifice outlet assembly to define laminar flow;

providing electrical power sufficient to generate a laser beam;

generating a laser beam adjacent said nozzle assembly;

directing said laser beam into an opening located within said inner wall;

directing said laser beam further through said nozzle assembly into an orifice located within said nozzle assembly;

directing a laminar flow stream from said outlet orifice around said laser beam to form a laser beam imbedded within said laminar flow stream;

and directing said imbedded laser beam within said laminar flow stream to a work piece to cut, machine or shape said work piece.

7. A method according to claim 6 said fluid is water.

8. A method according to claim 7 including passing said fluid stream through a double walled bladder hose to reduce ambient pressure variations.

9. A method according to claim 7 wherein said orifice assembly comprises a knife edged orifice.

10. A method according to claim 9 including moving said work piece relative to said laser imbedded fluid to effect cutting, shaping or machining of said work piece.

* * * * *